United States Patent [19]

Shimizu et al.

[11] Patent Number: 5,658,505
[45] Date of Patent: Aug. 19, 1997

[54] PROCESS FOR MAKING A PHASE RETARDER FILM

[75] Inventors: Akiko Shimizu, Ibaraki; Koji Higashi, Takatsuki, both of Japan

[73] Assignee: Sumitomo Chemical Company, Limited, Osaka, Japan

[21] Appl. No.: 394,494

[22] Filed: Feb. 27, 1995

[30] Foreign Application Priority Data

Feb. 28, 1994 [JP] Japan ................................. 6-030070
Jun. 13, 1994 [JP] Japan ................................. 6-130623

[51] Int. Cl.$^6$ .................................................. B29D 11/00
[52] U.S. Cl. .................... 264/1.34; 264/216; 264/288.4
[58] Field of Search .......................... 359/73; 264/1.31, 264/1.34, 216, 288.4, 289.6

[56] References Cited

U.S. PATENT DOCUMENTS

| | | | |
|---|---|---|---|
| 5,061,042 | 10/1991 | Nakamura et al. | 359/73 |
| 5,285,303 | 2/1994 | Okada et al. | 359/73 |
| 5,366,682 | 11/1994 | Morikawa et al. | 264/1.34 |
| 5,472,538 | 12/1995 | Minakuchi et al. | 264/230 |
| 5,474,731 | 12/1995 | Morikawa et al. | 264/1.34 |

FOREIGN PATENT DOCUMENTS

| | | | |
|---|---|---|---|
| 0482620 | 4/1992 | European Pat. Off. . | |
| 541308 | 5/1993 | European Pat. Off. | 359/73 |
| 0546748 | 6/1993 | European Pat. Off. . | |
| 58-14118 | 1/1983 | Japan . | |
| 60-97323 | 5/1985 | Japan . | |
| 4162018 | 6/1992 | Japan . | |

OTHER PUBLICATIONS

The 13th International Display Research Conference, Council of Europe/European Parliament Aug. 31–Sep. 3, 1993 Conference Proceedings. pp. 149–152.

*Primary Examiner*—Mathieu D. Vargot
*Attorney, Agent, or Firm*—Sughrue, Mion, Zinn, Macpeak & Seas

[57] ABSTRACT

A phase retarder film made of a thermoplastic resin having an in-plane retardation of 50 to 300 nm and a ratio of the in-plane retardation to the retardation normal to the plane of not less than 0.5 but not more than 1.8, a process for the production thereof and a laminate phase retarder film using said phase retarder film above.

5 Claims, No Drawings

PROCESS FOR MAKING A PHASE RETARDER FILM

BACKGROUND OF THE INVENTION

1. Field of the Invention

The present invention relates to a phase retarder film.

2. Description of the Related Art

Phase retarder films have been used as optical compensators for STN liquid crystal display devices and in more recent years their various applications to optical compensators for other types of liquid crystal display device than the STN type have also been studied. For example, there have recently been cases that liquid crystal display devices of the STN and TN types are required to have specific viewing angle characteristics depending upon their application. For this reason there is a need for many kinds of phase retarder films having optical characteristics for respective applications. However, the currently developed phase retarder films are restricted to two types, i.e., one having characteristics close to those of the uniaxially orientated films used for the aforementioned STN liquid crystal display device and the other having characteristics close to those of the perfectly biaxially orientated films comprising a layered inorganic compound layer, in which the in-plane refractive index is different from the refractive index in the direction of thickness, as described in EP-A-0541308. There have not been developed such phase retarder film as having characteristics intermediate between these two types of phase retarder films so far.

Proceedings of Eurodisplay '93, p. 149 reports a simulation where a phase retarder film having refractive indices, $n_x=1.618$, $n_y=1.606$, and $n_z=1.493$ and a thickness of 9.296 μm is effective as optical compensator for the bend orientation type OCB mode liquid crystal display device (π cell). Calculation based on the data for the phase retarder film indicates that the in-plane retardation is 112 nm and the ratio of the in-plane retardation to the retardation normal to the plane is 0.101.

However, the phase retarder films which have heretofore been used for the STN liquid crystal display device have a ratio of the in-plane retardation to the retardation normal to the plane of not less than 2.0 due to the uniaxially orientated structure of the films. On the other hand, the phase retarder films comprising a layered inorganic compound layer having an in-plane refractive index and a refractive index normal to the plane which are different from each other can not be produced unless the in-plane retardation is in the range of 0 to 50 nm as described in EP-A-0541308. Therefore, any phase retarder film having characteristics useful as, for example, optical compensator for the aforementioned π cell can not be obtained from those films which have been developed for current mass-production of phase retarder films or even from their combination. For this reason, there is a need to develop phase retarder films having optical characteristics different from those of the conventional ones. Especially the development of phase retarder films made of light weight thermoplastic resins and a process for producing efficiently and advantageously in industry such phase retarder films.

SUMMARY OF THE INVENTION

An object of the present invention is to provide a phase retarder film having an in-plane retardation of 50 to 300 nm and a ratio of the in-plane retardation to the retardation normal to the plane of not less than 0.5, but not more than 1.8.

Another object of the present invention is to provide a process for producing a phase retarder film having an in-plane retardation of 50 to 300 nm and a ratio of the in-plane retardation to the retardation normal to the plane of not less than 0.5, but not more than 1.8 using thermoplastic resins.

Still another object of the present invention is to provide a laminate phase retarder film having a ratio of the in-plane retardation to the retardation normal to the plane of 0.03 or more to less than 0.3 comprising a first phase retarder film having an in-plane retardation of 50 to 300 nm and a ratio of the in-plane retardation to the retardation normal to the plane of not less than 0.5, but not more tan 1.8 and a second phase retarder film comprising a layered inorganic compound layer laminated on said first phase retarder film.

Still another object of the present invention is to provide a process for producing such a laminate phase retarder film having a ratio of the in-plane retardation to the retardation normal to the plane of 0.03 or more to less than 0.3 comprising said first phase retarder film and said second phase retarder film comprising a layered inorganic compound layer laminated on said first phase retarder film.

DETAILED DESCRIPTION OF PREFERRED EMBODIMENTS

The present inventors have made a research to overcome the difficulties as described above and successfully developed a phase retarder film having an in-plane retardation of 50 to 300 nm and a ratio of the in-plane retardation to the retardation normal to the plane of not less than 0.5, but not more than 1.8, which an embodiment of the present invention is based on. Moreover, they have successfully developed a laminate phase retarder film having a ratio of the in-plane retardation to the retardation normal to the plane of 0.03 or more to less than 0.3 comprising a first phase retarder film having an in-plane retardation of 50 to 300 run and a ratio of the in-plane retardation to the retardation normal to the plane of not less than 0.5, but not more than 1.8 and a second phase retarder film comprising a layered inorganic compound layer laminated on said first phase retarder film, which another embodiment of the present invention is based on.

Moreover, the present invention relates to a phase retarder film made of a thermoplastic resin having an in-plane retardation of 50 to 300 nm and a ratio of the in-plane retardation to the retardation normal to the plane of not less than 0.5, but not more than 1.8 and a process for producing the same. Furthermore, the present invention relates to a process for producing such a laminate phase retarder film having a ratio of the in-plane retardation to the retardation normal to the plane of 0.03 or more to less than 0.3 comprising said first phase retarder film and said second phase retarder film comprising a layered inorganic compound layer laminated on said first phase retarder film.

The thermoplastic resins to be preferably used include those excellent in transparency, for example, polycarbonates, cellulose diacetate, polyvinylalcohols, polysulfones, polyethersulfones, polyarylates, and the like. Among them polycarbonates and polysulfones are more preferred.

The thermoplastic resin films to be used may ordinarily be produced by a solvent casting process. The thickness of the thermoplastic resin films ranges, for example, from 50 to 300 μm, preferably 100 to 200 μm.

The phase retarder films of the present invention may be produced by, for example, the following process:

The thermoplastic resin films produced by a solvent casting process are transferred into a tenter comprising a train of a preheating section, a stretching section and a heat-treating section and subjected sequentially to preheating, uniaxially stretching and heat-treating therein. The term "preheating" as used here means a treatment to previously soften the thermoplastic resin films by heating so that the films can be satisfactorily stretched in the next stretching treatment.

The thermoplastic resin films transferred into the apparatus are preheated under the conditions of $Tg<Tp\leq(Tg+100°\ C.)$, where Tg represents the glass transition temperature of the thermoplastic resin and Tp represents the preheating temperature, and the preferred preheating time is usually in the range of 0.1 to one minute in order to soften the resin films to a requisite extent as well as to suppress deformation of the resin films more than the required softening.

Next, the preheated films are transferred into the stretching section where they are uniaxially stretched in the transverse direction normal to the film proceeding direction at a deformation rate of 150%/min. to 1000%/min. at a stretching ratio of 2 to 3 times the original width under the conditions of $Tg<Ts\leq(Tg+100°\ C.)$, where Ts represents the stretching temperature, with no shrinkage being caused in the direction normal to the stretching direction. The stretching temperature, the deformation rate and the stretching ratio are in principle selected by routine procedures depending upon the kind and thickness of the thermoplastic resin films to be used as raw films, and the in-plane retardation, the ratio of the in-plane retardation to the retardation normal to the plane and the thickness of the requisite phase retarder film, and the like. For example, when polycarbonates are used, preferably the stretching temperature is in the range from 190° to 220° C., the deformation rate from 150 to 600%/min. and the stretching ratio from 2 to 3 times. Generally a reduction in stretching temperature, or an increase in deformation rate, or an increase in stretching ratio tends to result in an increased in-plane retardation, and an increase in stretching ratio tends to increase the ratio of the in-plane retardation to the retardation normal to the plane.

Next, the uniaxially stretched films are transferred into the heat-treating section where they are subjected to a temperature retaining step, so-called heat-treatment, i.e., they are kept at a temperature in the range of $(Ts-50°\ C.)\leq Ths\leq Ts$, where Ths represents the heat-treatment temperature, usually for 0.1 to one minute with the chuck width, i.e., the stretched width of the films achieved after stretching being kept in order to fix the orientation of the films. At this time, the films may shrink in the range from 0 to 10% in the stretching direction if necessary. When the shrinking is desired, it can be achieved by, for example, narrowing the chuck width to a desired shrinking proportion.

Although the process for preheating, uniaxially stretching and heat-treating may be performed by any other technique than the use of the tenter as described above, the tenter is preferably employed in the industrial production.

The thus produced phase retarder films should have an in-plane retardation of 500 nm 300 nm and a ratio of the in-plane retardation to the retardation normal to the plane of not less than 0.5, but not more than 1.8 so that they have quite different optical characteristics from those of conventional phase retarder films. The phase retarder film may be referred to simply as "phase retarder film A" in the specification.

The in-plane retardation and the ratio of the in-plane retardation to the retardation normal to the plane can be set to desired levels by routine procedures depending upon the end-use to which the phase retarder films are to be put. The in-plane retardation is preferably in the range from 80 nm to 200 nm, and the retardation normal to the plane is preferably in the range from 45 nm to 400 nm. The thickness of the phase retarder films is preferably in the range from 50 to 150 μm in view of handling properties.

The phase retarder films A can be used alone or in combination with other phase retarder films as optical compensators for various liquid crystal display devices.

For example, the phase retarder films A may be used in combination with the phase retarder films having an in-plane retardation of 0 to 50 nm and a retardation normal to the plane of 50 nm to 1000 nm and comprising a layered inorganic compound layer having an in-plane refractive index and a refractive index normal to the plane which are different from each other as disclosed in EP-A-0541308. The phase retarder film comprising a layered inorganic compound layer may be referred to simply as "phase retarder film B" in the specification.

The phase retarder films B may be produced by dispersing the layered inorganic compound into a solvent or swelling it with a solvent, then coating and drying as described in EP-A-0541308.

The layered inorganic compounds to be used include, for example, clay minerals. Examples of layered inorganic compounds include preferably synthesized sodium tetrasilicate mica with low impurity and smectite family minerals such as montmorillonite, beidelite, nontronite, saponite, hectorite, sauconite, and synthesized compounds having a crystalline structure similar to those of the smectite family.

The solvents to be used for swelling or dispersing the layered inorganic compounds may be optionally selected from, for example, dimethylformamide, dimethylsulfoxide, nitromethane, water, methanol, and ethylene glycol.

In the production of the layer of the layered inorganic compounds, as described in EP-A-0541308, a dispersion of the layered inorganic compounds may preferably be mixed with an optically transparent hydrophilic resin in order to improve layer-formability and physical properties such as resistance to crack of the layers. The ratio by volume of the layered inorganic compound to the optically transparent resin may be, for example, in the range from 0.1 to 10. As an example of optically transparent hydrophilic resin, mention may be made of polyvinylalcohol.

A layered inorganic compound layer may be formed on an optically transparent resin film to produce a phase retarder film B reinforced with the optically transparent resin film. Phase retarder film B also implies this laminate film in the present invention. This laminate film may be referred to simply as "phase retarder film B1" in the specification.

The techniques for laminating the phase retarder film A and the phase retarder film B are not critical. For example, a process comprising forming a layered inorganic compound layer directly on a phase retarder film A, or a process comprising adhering a phase retarder film B1, as disclosed in EP-A-0541308, onto a phase retarder film A with an adhesive or sticking agent can be employed. The number of phase retarder films to be laminated, optical characteristics of each phase retarder film, i.e., the in-plane retardation, the ratio of the in-plane retardation to the retardation normal to the plane and the like may be optionally selected depending upon the optical characteristics required by the final laminate phase retarder films.

When two or more phase retarder films A are used in the laminate phase retarder film, the lamination between one phase retarder film A and other phase retarder film A can be performed in the manner that the slow axis of one phase retarder film A is parallel or normal to that of the other phase retarder film A depending upon the optical characteristics required by the final laminate phase retarder film.

When at least one laminate phase retarder film B1 having an in-plane retardation is laminated onto at least one phase retarder film A, the lamination between phase retarder film B1 and phase retarder film A or between one phase retarder film B1 and other phase retarder film B1, can be performed in the manner that the slow axis of one phase retarder film is parallel or normal to that of other phase retarder film depending upon the optical characteristics required by the final laminate phase retarder film, whereby the finally required optical characteristics can be achieved.

The laminate phase retarder film produced by laminating the phase retarder film A on the phase retarder film B can be used as an optical compensator having a ratio of the in-plane retardation to the retardation normal to the plane of 0.03 or higher to less than 0.3.

The phase retarder film A has novel optical characteristics such as an in-plane retardation of 50 to 300 nm and a ratio of the in-plane retardation to the retardation normal to the plane of not less than 0.5, but not more than 1.8, and can be used alone or in combination with other phase retarder films as optical compensators for various schemes of liquid crystal display device. Moreover, the laminate phase retarder film produced by laminating at least one phase retarder film A on at least one phase retarder film B can be used as an optical compensator having a ratio of the in-plane retardation to the retardation normal to the plane of 0.03 or higher to less than 0.3. Furthermore, the present invention allows quite advantageously in industry the efficient and steady mass-production with high productivity of the phase retarder films as described above.

The present invention will be illustrated in detail with reference to Examples without being limited thereto.

The in-plane retardation was determined by means of a polarizing microscope equipped with Senarmont compensator with the film plane being normal to the optical system. The retardation normal to the plane was determined according to the following formula:

Retardation normal to the plane=$[(n_x+n_y)/2-n_z] \times d$ where $n_x$ represents the maximum refractive index in the film plane, $n_y$ represents a refractive index normal to the $n_x$ in the film plane, $n_z$ represents a refractive index normal to the film plane and d represents a thickness of the film.

The laminate phase retarder film comprising at least one phase retarder film A and at least one phase retarder film B is regarded as a mono-layer phase retarder film as a whole, and the in-plane retardation and the retardation normal to the plane of the film were determined in the same manner as above.

EXAMPLE 1

A continuous film of polycarbonate (Tg: 148° C.) having a thickness of 140 μm was prepared by solvent casting process. This film was transferred into a tenter having a preheat-treating section of 3 m in length, a stretching section of 6 m and a heat-treating section of 3 m and subjected sequentially to preheat-treatment at a temperature of 220° C. for 20 seconds, transverse uniaxially stretching treatment in the direction normal to the film proceeding direction at a deformation rate of 200%/min., at a stretching temperature of 207° C. and at a stretching ratio of 2.2 times the original width, and then heat-treatment at a temperature of 180° C. for 20 seconds with no shrinkage in the stretching direction.

The thus obtained phase retarder film had a thickness of 58 μm, an in-plane retardation of 101 nm, a retardation normal to the plane of 143 nm and a ratio of the in-plane retardation to the retardation normal to the plane of 0.706.

EXAMPLE 2

A continuous film of polycarbonate (Tg: 148° C.) having a thickness of 140 μm was prepared by solvent casting process. This film was transferred into the tenter identical to that used in Example 1, and subjected sequentially to preheat-treatment at a temperature of 220° C. for 20 seconds, transverse uniaxially stretching treatment in the direction normal to the film proceeding direction at a deformation rate of 233%/min., at a stretching temperature of 200° C. and at a stretching ratio of 2.4 times the original width, and then heat-treatment at a temperature of 180° C. for 20 seconds with a shrinkage in the stretching direction of 8.3%.

The thus obtained phase retarder film had a thickness of 60 μm, an in-plane retardation of 117 nm, a retardation normal to the plane of 159 nm and a ratio of the in-plane retardation to the retardation normal to the plane of 0.736.

EXAMPLE 3

A continuous film of polycarbonate (Tg: 148° C.) having a thickness of 185 μm was prepared by solvent casting process. This film was introduced into the tenter identical to that used in Example 1, and subjected sequentially to preheat-treatment at a temperature of 220° C. for 10 seconds, transverse uniaxially stretching treatment in the direction normal to the film proceeding direction at a deformation rate of 467% /min., at a stretching temperature of 208° C. and at a stretching ratio of 2.4 times the original width, and then heat-treatment at a temperature of 200° C. for 10 seconds with no shrinkage in the stretching direction.

The thus obtained phase retarder film had a thickness of 70 μm, an in-plane retardation of 119 nm, a retardation normal to the plane of 143 nm and a ratio of the in-plane retardation to the retardation normal to the plane of 0.832.

EXAMPLE 4

On the surface of a triacetylcellulose film having a thickness of 80 μm (available from Fuji Photo Film Co., Ltd. under the tradename FUJITAC) which surface had been subjected to saponification, an aqueous dispersion obtained by mixing an aqueous 5% dispersion of synthetic hectorite (available from Laporte Absorbents Co., under the tradename LAPONITE XLS) and an aqueous 2.5% solution of polyvinylalcohol having a saponification of 98.5% and a degree of polymerization of 300 (available from Kuraray Co., Ltd. under the tradename POVAL 103) in a ratio of 3:7 by volume was coated to a film thickness of 23 μm on dryness to produce a phase retarder film comprising a triacetylcellulose film having an layered inorganic compound layer formed thereon (referred to as Film X hereunder). The film X had an in-plane retardation of 8 nm, a retardation normal to the plane of 370 nm and a thickness of 103 μm.

Two films X were laminated with the slow axis of each film being parallel to each other using an acrylic adhesive, to which a phase retarder film prepared in the same manner as in Example 2 was laminated using an acrylic adhesive with its slow axis being perpendicular to the slow axis of the film x to produce a laminate phase retarder film. The laminate phase retarder film had a thickness of 316 μm, an in-plane retardation of 105 nm, a retardation normal to the plane of 1012 nm and a ratio of the in-plane retardation to the retardation normal to the plane of 0.104.

EXAMPLE 5

The same procedure as in Example 4 was repeated, except that the film thickness on dryness was 16 μm, to produce a phase retarder film comprising a layered inorganic compound layer (referred to as film Y hereunder). The film y had an in-plane retardation of 10 nm, a retardation normal to the plane of 305 nm and a thickness of 96 μm.

Onto the film Y was adhered a phase retarder film prepared in the same manner as in Example 2 using an acrylic adhesive with its slow axis being perpendicular to the slow axis of the film Y to produce a laminate phase retarder film. The laminate phase retarder film had a thickness of 211 μm, an in-plane retardation of 110 nm, a retardation normal to the plane of 545 nm and a ratio of the in-plane retardation to the retardation normal to the plane of 0.202.

What is claimed is:

1. A process for producing a phase retarder film having an in-plane retardation of 50 to 300 nm and a ratio of the in-plane retardation to the retardation normal to the plane of not less than 0.5, but not more than 1.8 comprising the steps of:

(1) preheating a thermoplastic resin film at a temperature Tp in the range of $Tg<Tp\leq(Tg+100°\ C.)$, where Tg represents the glass transition temperature of the thermoplastic resin and Tp represents the preheating temperature, (2) stretching uniaxially the film from step (1) at a deformation rate of 150%/min. to 1000%/min. at a stretching ratio of 2 to 3 times the original length at a temperature Ts in the range of $Tg<Ts\leq(Tg+100°\ C.)$, where Ts represents the stretching temperature, with no shrinkage being caused in the direction normal to the stretching direction, and (3) heat-treating the film from step (2) at a temperature Ths in the range of $(Ts-50°\ C.)\leq Ths\leq Ts$, where Ths represents the heat-treatment temperature.

2. The process according to claim 1, wherein said heat-treating is performed with a shrinkage in the stretching direction being not more than 10%.

3. The process according to claim 1, wherein said thermoplastic resin film is produced by solvent casting process.

4. The process according to claim 1, wherein said thermoplastic resin is a polycarbonate resin or a polysulfone resin.

5. The process according to claim 1, wherein said in-plane retardation is in he range from 80 to 200 nm.

* * * * *